United States Patent
Rice et al.

(10) Patent No.: US 7,526,908 B1
(45) Date of Patent: May 5, 2009

(54) WINDROW MERGER LIFT ASSIST BAR

(75) Inventors: Robert L. Rice, New Holland, PA (US); David M. DeChristopher, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/955,533

(22) Filed: Dec. 13, 2007

(51) Int. Cl.
*A01D 43/00* (2006.01)
*A01D 57/00* (2006.01)

(52) U.S. Cl. ...................................................... 56/192
(58) Field of Classification Search ............... 56/192, 56/385, 153, 14.9, 189, 181, 366, 370
See application file for complete search history.

(56) References Cited

U.S. PATENT DOCUMENTS

| | | | |
|---|---|---|---|
| 2,529,422 A | 11/1950 | Sampson | |
| 2,634,662 A | 4/1953 | Drummond | |
| 2,685,242 A | 8/1954 | Rusco | |
| 2,761,270 A | 9/1956 | Blaser et al. | |
| 2,952,112 A | 9/1960 | Cobb | |
| 3,149,449 A | 9/1964 | Mulder | |
| 4,590,751 A * | 5/1986 | Stephenson | 56/192 |
| 4,910,951 A * | 3/1990 | Reilly et al. | 56/376 |
| 5,031,393 A * | 7/1991 | Rostoucher | 56/154 |
| 5,086,847 A | 2/1992 | Meiners | |
| 5,135,057 A * | 8/1992 | Dircks | 172/456 |
| 5,353,579 A | 10/1994 | Wolff | |
| 6,145,289 A * | 11/2000 | Welsch et al. | 56/192 |
| 6,212,865 B1 | 4/2001 | Peeters et al. | |
| 6,345,490 B1 | 2/2002 | Wolff | |
| 6,415,590 B1 * | 7/2002 | Lohrentz | 56/192 |
| 6,832,467 B2 * | 12/2004 | Franet et al. | 56/192 |
| 6,907,719 B2 * | 6/2005 | Ligouy | 56/15.1 |
| 7,028,459 B2 * | 4/2006 | Lohrentz et al. | 56/192 |
| 7,055,300 B2 | 6/2006 | Wolff | |
| 7,310,929 B2 * | 12/2007 | Dow et al. | 56/192 |
| 2007/0068131 A1 * | 3/2007 | Talbot et al. | 56/192 |

* cited by examiner

*Primary Examiner*—Árpád Fábián-Kovács
(74) *Attorney, Agent, or Firm*—Patrick M. Sheldrake; John William Stader; Michael G. Harms

(57) ABSTRACT

A lift assist bar for a windrow merger lift mechanism comprising an elongate lift bar connected at one end to the lift mechanism using a ball joint and having a bearing structure on the opposite end, a fulcrum pin connected to a lift arm of the mechanism for contact with an intermediate point of the lift bar between the opposing ends, and a bearing pad connected to the windrower chassis wherein said lift assist bar, being positioned by movement of the lift mechanism from a working position of the merger apparatus toward a non-working position such that the bearing structure contacts the bearing pad, causes the merger assembly to be lifted and held in the non-working position thereby reducing stresses on other linkage members of the lift mechanism.

17 Claims, 4 Drawing Sheets

WINDROW MERGER LIFT ASSIST BAR

BACKGROUND OF THE INVENTION

The present invention relates to agricultural windrowers using merger apparatus for directing crop material and, more particularly, to a lift assist bar for stabilizing a movable merger apparatus when in a raised, non-working position.

A windrower typically consists of a self-propelled tractor or similar vehicle, and a cutting mechanism which is either towed by the tractor or carried thereby. The cutting mechanism carried by a windrower is typically referred to as a header, and is supported on the windrower by forwardly projecting arms. Current practice in agriculture is to cut a relatively wide swath of the crop within a range of anywhere between 10 and 16 or more feet in width, and then consolidate the crop into a narrower, substantially continuous windrow, in which form the crop is left to dry in the field until the moisture content has been reduced to a value suitable for subsequent harvesting operations, such as baling.

More current practice is to combine multiple windrows together as they are being mowed. This practice eliminates a raking operation and also reduces the number of passes of subsequent harvesting operations (e.g., chopping and baling). With the advent of higher capacity forage harvesters and balers, merging windrows is becoming a more desirable practice. Windrow merging attachments are thus more prevalent on harvesting machines. Additional flexibility in harvesting operations is provided by lift mechanisms which enable the merger apparatus to be selectively positioned for merging or non-merging operation thus eliminating machine down-time required to install/remove a fixed-position merger apparatus to switch between windrowing operational modes.

Merger lift mechanisms are required to provide unique movement of the merger apparatus, combining vertical translation as well as simultaneous rotation about two or more axes. Complicated merger lift mechanisms are often required to provide such movement. Experience has shown that these mechanisms may have trouble withstanding high vertical accelerations experienced by a self-propelled windrower under typical operation over uneven terrain when the merger is in the fully-raised position. A conventional approach of increasing the strength of individual members of the linkage mechanism to withstand the applied stresses has proven to be not overly cost-effective.

It would be a great advantage to provide a cost-effective means of stabilizing a selectively positionable windrow merger apparatus that enables a merger lift mechanism to withstand operating stresses to which it is subjected during typical windrower operation that overcomes the above problems and disadvantages.

SUMMARY OF THE INVENTION

Accordingly, it is an object of the present invention to provide a lift assist bar for a lift mechanism for a windrow merger apparatus that reduces stress levels in other linkage members of the lift mechanism.

It is a further object of the present invention to provide a lift assist bar for a lift mechanism for a windrow merger that is easily integrated with the lift mechanism linkage.

It is a further object of the present invention to provide a lift assist bar for a windrow merger lift mechanism that strengthens the lift mechanism when the merger apparatus is in a non-working position without interfering with normal merger movement.

It is a further object of the present invention to provide a lift assist bar for a windrow merger lift mechanism that integrates with the existing design of the lift mechanism to reduce stress levels in individual linkage members of the mechanism.

It is a still further object of the present invention to provide a lift assist bar for a windrow merger lift mechanism that does not interfere with normal movement of the merger between working and non-working positions.

It is a still further object of the present invention to provide a lift assist bar for a windrow merger lift mechanism that is durable in construction, inexpensive of manufacture, carefree of maintenance, easily assembled, and simple and effective to use.

These and other objects are achieved by providing a lift assist bar for a windrow merger lift mechanism comprising an elongate lift bar connected at one end to the lift mechanism using a ball joint and having a bearing structure on the opposite end, a fulcrum pin connected to a lift arm of the mechanism for contact with an intermediate point of the lift bar between the opposing ends, and a bearing pad connected to the windrower chassis wherein said lift assist bar, being positioned by movement of the lift mechanism from a working position of the merger apparatus toward a non-working position such that the bearing structure contacts the bearing pad, causes the merger assembly to be lifted and held in the non-working position thereby reducing stresses on other linkage members of the lift mechanism.

BRIEF DESCRIPTION OF THE DRAWINGS

The advantages of this invention will be apparent upon consideration of the following detailed disclosure of the invention, especially when taken in conjunction with the accompanying drawings wherein.

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
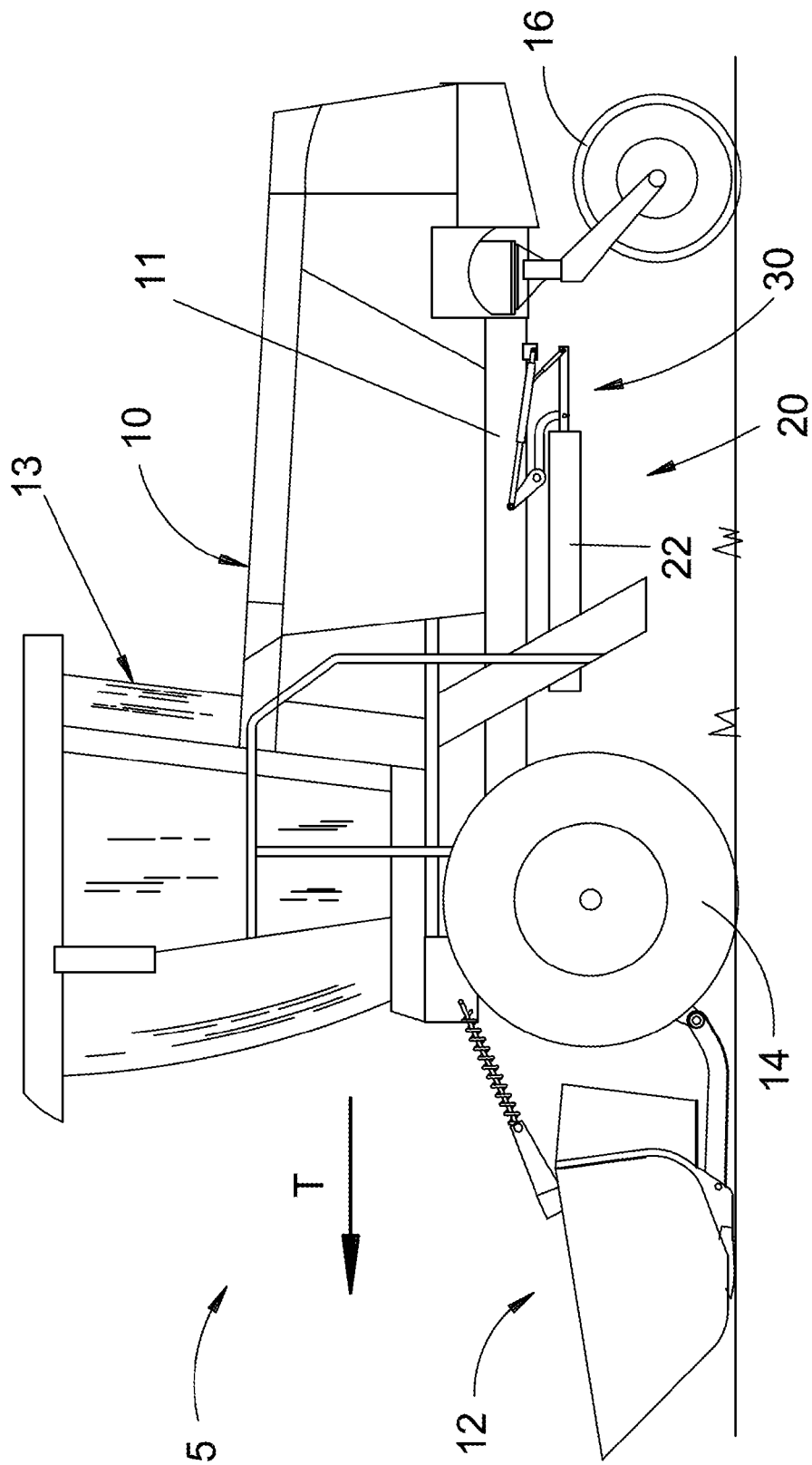
FIG. 1 is a side elevation view of a typical self-propelled windrower of the type on which the present invention is useful.

FIG. 1 shows a side view of a typical self-propelled windrower 5 used for harvesting a crop material as it travels across the ground in the direction indicated by arrow "T." Usually, a tractor 10 pushes a header 12 which severs the crop material from the ground, usually by a sickle-bar, rotary cutter or other functionally equivalent cutting means. The tractor 10 has a chassis 11 for supporting various components of the windrower 5, including a set of transversely spaced-apart drive wheels 14 for propelling the windrower across the ground and at least one, and typically a pair of rear wheels 16 in the form of castors which allow the windrower to turn. There is an operator cab 13 where the operator controls the windrower operation. The crop is cut by a cutting means (not shown) in the leading edge of the header and falls rearwardly into the header. The crop material is urged toward the center of the header where it may be conditioned prior to discharge from the header. The crop is then ejected rearwardly from the header 12, generally in the space between the drive wheels 14 whereupon it falls to the ground. Shields (not shown) are used to arrange the crop into a windrow that is formed generally along the longitudinal axis of the windrower.

Windrower 10 also includes a merger apparatus 20 which is disposed under chassis 11 for directing crop material being discharged from header 12 to a location laterally displaced from the longitudinal centerline of the windrower 5. In this manner, windrows of harvested crop material may be positioned for merging with the harvested crop material from a previous separate pass by the windrower, usually when the windrower travels in the opposite direction along an adjacent path. Unlike known merger mechanisms in which the merger apparatus is fixed in relationship to the tractor chassis 11 and must be manually removed if traditional single-pass windrowing is desired, the present windrower includes a lift mechanism 30 for selectively positioning movable frame 22 thereby enabling merger apparatus 20 to be positioned in a working position for windrow merging operation, and also in a non-working position for forming windrows that trail behind generally along the windrower longitudinal centerline. As shown in FIG. 1, the movable merger apparatus 20 is positioned in a non-working position for windrowing operating in which windrow merging operation is not desired. A representative merger lift mechanism is disclosed in U.S. patent application Ser. No. 11/949,967 by McLean et al., held by a common assignee as the present application, and is incorporated in its entirety by reference herein.

Figure 2:
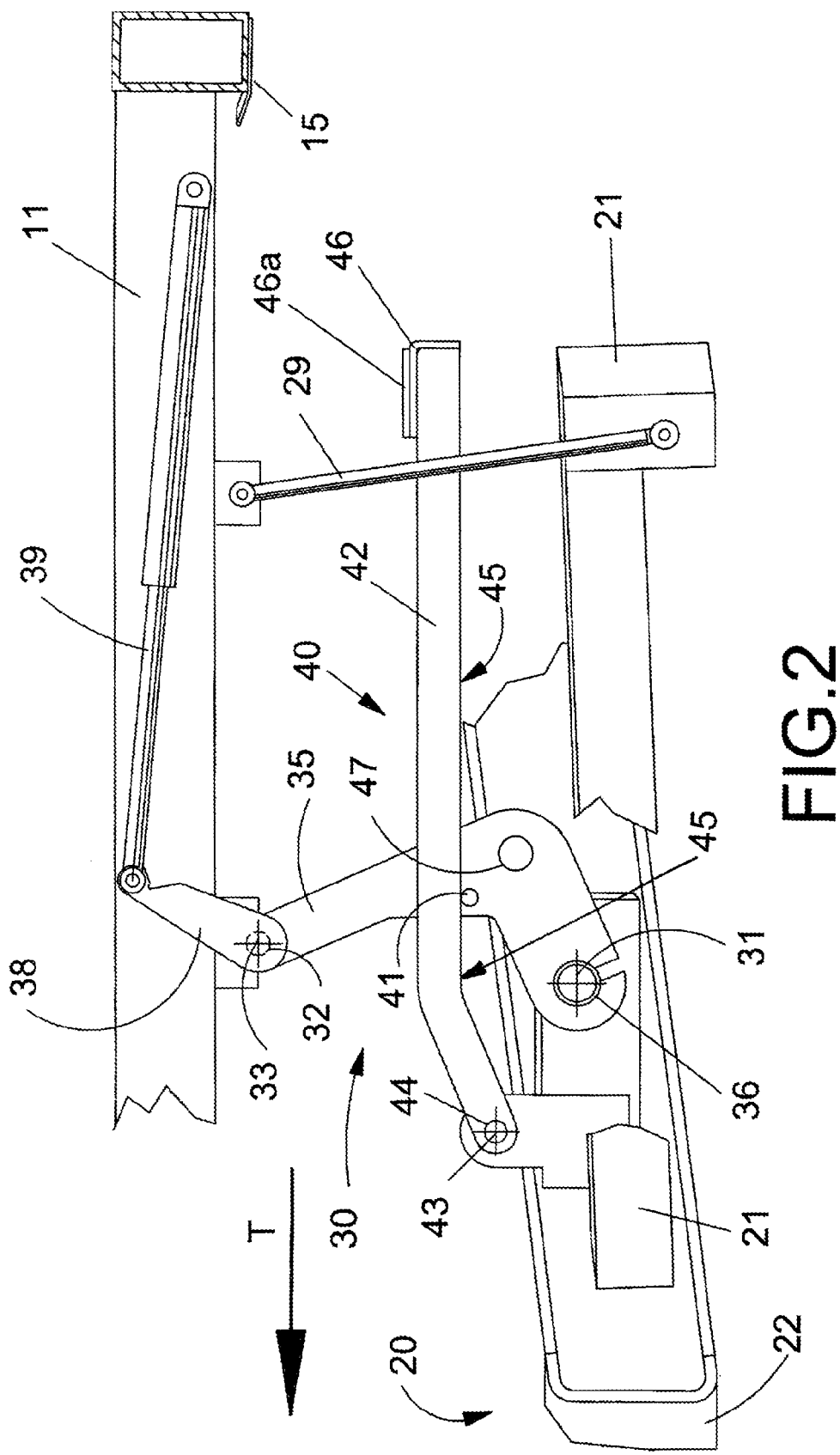
FIG. 2 is a partial side elevation view of a windrower chassis having a merger apparatus movable by a merger lift mechanism of the type on which the present invention is useful, shown with the merger apparatus in a working position.

Referring to FIG. 2, a partial side elevation view of the windrower is presented showing chassis 11, the merger apparatus 20, its supporting movable frame 22, and the lift mechanism 30, including lift assist device 40, with the merger apparatus in the working or lowered position. When in the working position, the merger apparatus 20 is positioned forwardly in relation to the chassis, lowered in relation to the ground, and tilted downwardly to the extent possible to allow the flow of crop material being discharged from the header to fall on the merger apparatus for lateral discharge from the windrower. The merger lift assist member 40 is non-functioning when the merger apparatus 20 is in the working position.

Merger apparatus 20 comprises a generally rectangular movable frame 22 supporting an endless loop-style conveyor (not shown) for moving crop material generally laterally with respect to the direction of travel. The conveyor is caused to move in a direction non-parallel to the direction of travel ("T" in FIG. 1), typically by a hydraulic motor. The conveyor surface may feature raised ribs or other protrusions for engaging the crop material and urging it in the direction of conveyor movement for discharge generally toward one side of the windrower. Mergers are well-known in the art and are, therefore, not further described in detail herein.

The lift mechanism 30 comprises a lift shaft 32 for actuating the lift mechanism which is rotationally connected to chassis 11. Actuator 39, typically a double-acting hydraulic cylinder, is connected to lift shaft 32 by a lever arm 38 such that extension and retraction of actuator 39 causes rotation of lift shaft 32 about rotational axis 33 between opposing first and second positions corresponding to merger working and non-working positions, respectively. In the embodiment shown, extension of actuator 39 rotates lift shaft toward the second position which corresponds to the non-working or raised position of the merger apparatus 20. Retraction of actuator 39 rotates lift shaft 32 toward the first position which corresponds to the working or lowered position of the merger apparatus 20.

At least one lift arm 35 is connected to lift shaft 32 such that it extends radially from the lift shaft 32 and moves through an arc as the lift shaft is rotated. Lift arm 35 is an elongate member having a connection end for connection to lift shaft 32, and a pivotal end distally opposed to the connection end. Lift arm 35 is preferably formed from plate material and thus has two generally parallel and opposing side surfaces which, as configured, are generally perpendicularly disposed in relation to lift shaft 32. The pivotal end includes a pivotal connection 36 which allows the merger apparatus 20 to pivot about the first pivotal axis 31. Pivotal movement of the merger apparatus 20 is managed by link 29 which connects between chassis 11 and a cantilever portion 21 of movable frame 22. The cantilever portion 21 extends rearwardly from movable frame 22 such that the first pivotal axis 31 is positioned between the movable frame and the distal end of the cantilever portion 21. As lift shaft 32 rotates from a first position which corresponds to a working position of the merger apparatus (as shown in FIG. 2), the merger apparatus is moved rearwardly and upwardly. The connection of link 29 to the merger frame 22 and chassis 11 causes the link to move, with respect to lift arm 35, in a parallelogram-like mode. Differences in the length of lift arm 35 and link 29 cause the movable frame to pivot about first pivotal axis 31 during this motion with the forward edge of the merger apparatus 20 being raised so that the movable frame position becomes generally horizontal to the ground as the merger apparatus 20 reaches the non-working (fully raised) position.

Lift assist device 40 comprises an elongate lift member 42 having a pin connection 44 at one end, a distally opposed bearing pad 46, and a shaped edge structure 45 disposed therebetween. Pin connection 44 allows the lift member 42 to pivot about second pivot axis 43. In the preferred embodiment, pin connection 44 is a ball joint which allows a small degree of non-pivotal movement of lift member 42 to prevent linkage binding in the lift mechanism 30 and lift assist device 40. Lift assist device 40 also includes a fulcrum structure 47 connected to lift arm 35 in a manner so as to project laterally from the planar side surfaces of the arm in a direction generally parallel to lift shaft 32. Fulcrum structure 47 projects sufficiently away from the surface of lift arm 35 so as to allow interaction with edge structure 45 in a manner to limit pivotal movement of the lift member 42 during arcuate movement of lift arm 35 arcuately moving from a rotational position corresponding to the merger working position toward the merger apparatus non-working position.

As is illustrated in FIG. 2, edge structure 45 is not in contact with fulcrum structure 47 when the merger apparatus 20 is fully in the working position. Lift member 42 is instead supported by support pin 41 when the merger apparatus is in the non-working position. Support pin 41 is connected to lift arm 35 and projects outwardly from the side planar surfaces of the lift arm, similar to the configuration of fulcrum structure 47, but is separated from fulcrum structure 47 on the side surface of the lift arm 35. Support pin 41 prevents lift member 42 from interacting with other linkages of the merger lift apparatus while the merger is in the working position.

Figure 3:
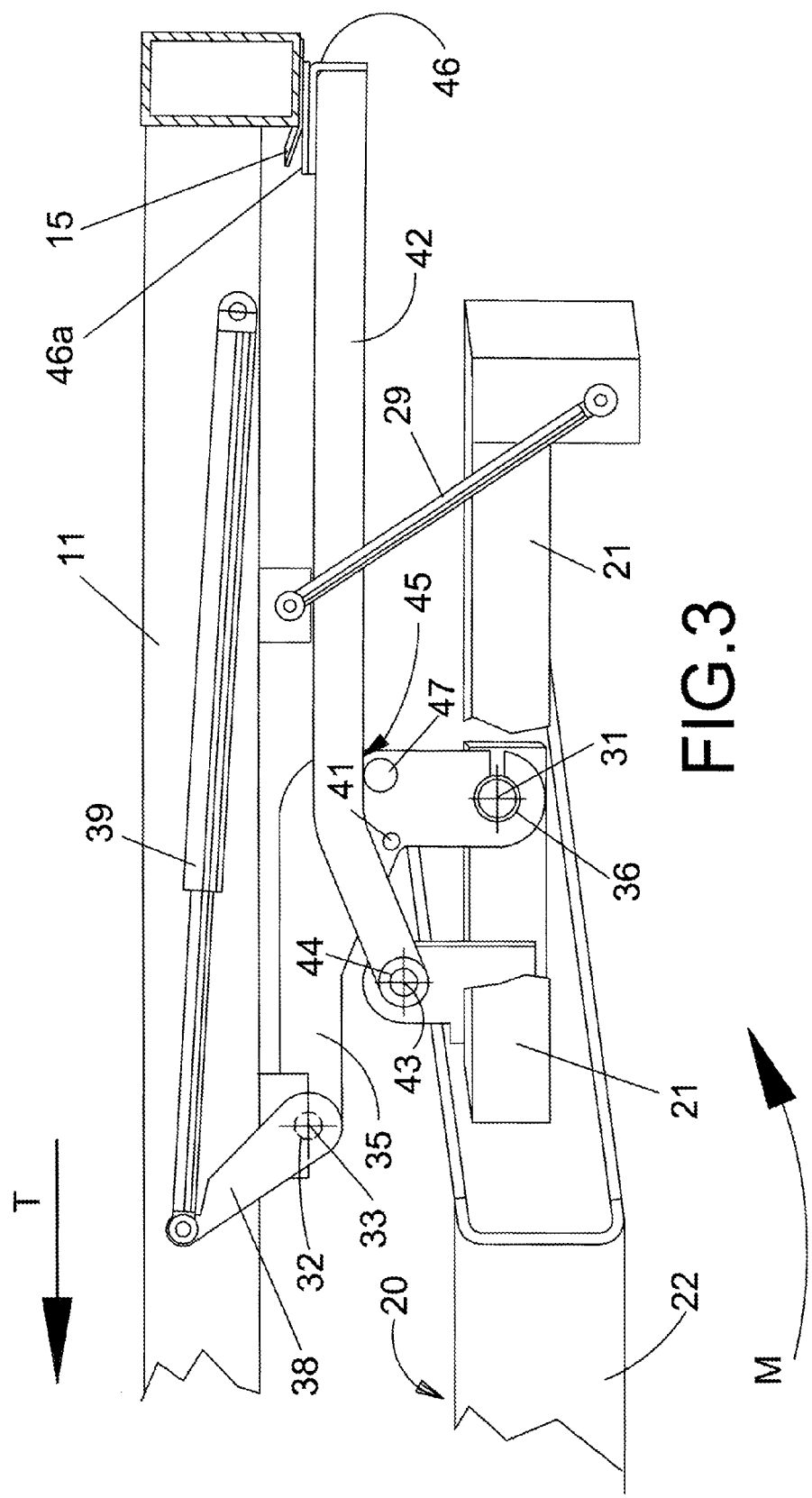
FIG. 3 is a partial side elevation view of the windrower chassis shown in FIG. 2, shown with the merger apparatus in a non-working or raised position for which the present invention is intended to function.

Now referring to FIG. 3, wherein the merger apparatus 20 is shown in the raised or non-working position, having moved upwardly relative to the ground and rearwardly relative to the chassis from the position shown in FIG. 2. In this position, lift shaft 32 has been rotated to a second position which brings lift arm 35 to the raised position and the movable frame 22 to its upper- and rearwardmost position. During movement from the working to the non-working position, shown as direction arrow "M," the arcuate motion of lift arm 35 brings fulcrum structure 47 into contact with edge structure 45 thereby causing lift member 42 to be raised from its resting position on support pin 41 as is shown in FIG. 2. Continued movement of the lift arm 35 and movable frame 22 toward the raised, non-working merger position causes bearing pad 46 to contact lift point 15 of the tractor chassis 11.

Once bearing pad 46 contacts the lift point 15, continued upward vertical movement of the bearing pad 46 end of lift member 42 will be prevented by contact with lift point 15. Fulcrum structure 47 will continue to move in an upward and rearward arc as lift arm 35 continues its arcuate motion which, in turn, urges edge structure 45 upward. As the bearing pad end is restrained from further upward movement, lift member 42 will pivot slightly about fulcrum structure 47 thereby causing second pivot axis 43 to be elevated in relation to fulcrum structure 47 and first pivot axis 31.

The application of an upward force on pin connection 44 enables the lift member 42 to support a portion of the weight of the merger apparatus 20 as it is raised, thus relieving some of the load from link 29 and redistributing some of the load on the ends connecting lift arm 35 to the rest of the lift device. The relationship between second pivot axis 43 and first pivot axis 31 also enables the upward force on pin connection 44 to exert a rotational moment on the movable frame 22 that causes the merger apparatus 20 to pivot toward a generally horizontal position from the tilted position as shown in FIG. 2.

Edge structure 45 is contoured in the area that is in contact with fulcrum structure during movement of the merger apparatus between the working and non-working positions. The contoured edge structure is provided to manage the trajectory of the bearing pad 46, especially during the portion of movement just prior to and during contact between the bearing pad and lift point 15. The profile of the edge structure 46 enables the bearing pad 46 to smoothly engage the lift point 15 thereby reducing wear and tear on the assembly.

As the merger apparatus 20 reaches the non-working or fully raised position, the lift member 42 acts in conjunction with lift arm 35 and link 29 to support the weight of the merger apparatus and to restrain the merger apparatus from excessive movement. In so doing, stress levels in each of the linkage members in the lift mechanism 30 are reduced and a more stable positioning means is provided for the merger apparatus.

Figure 4:
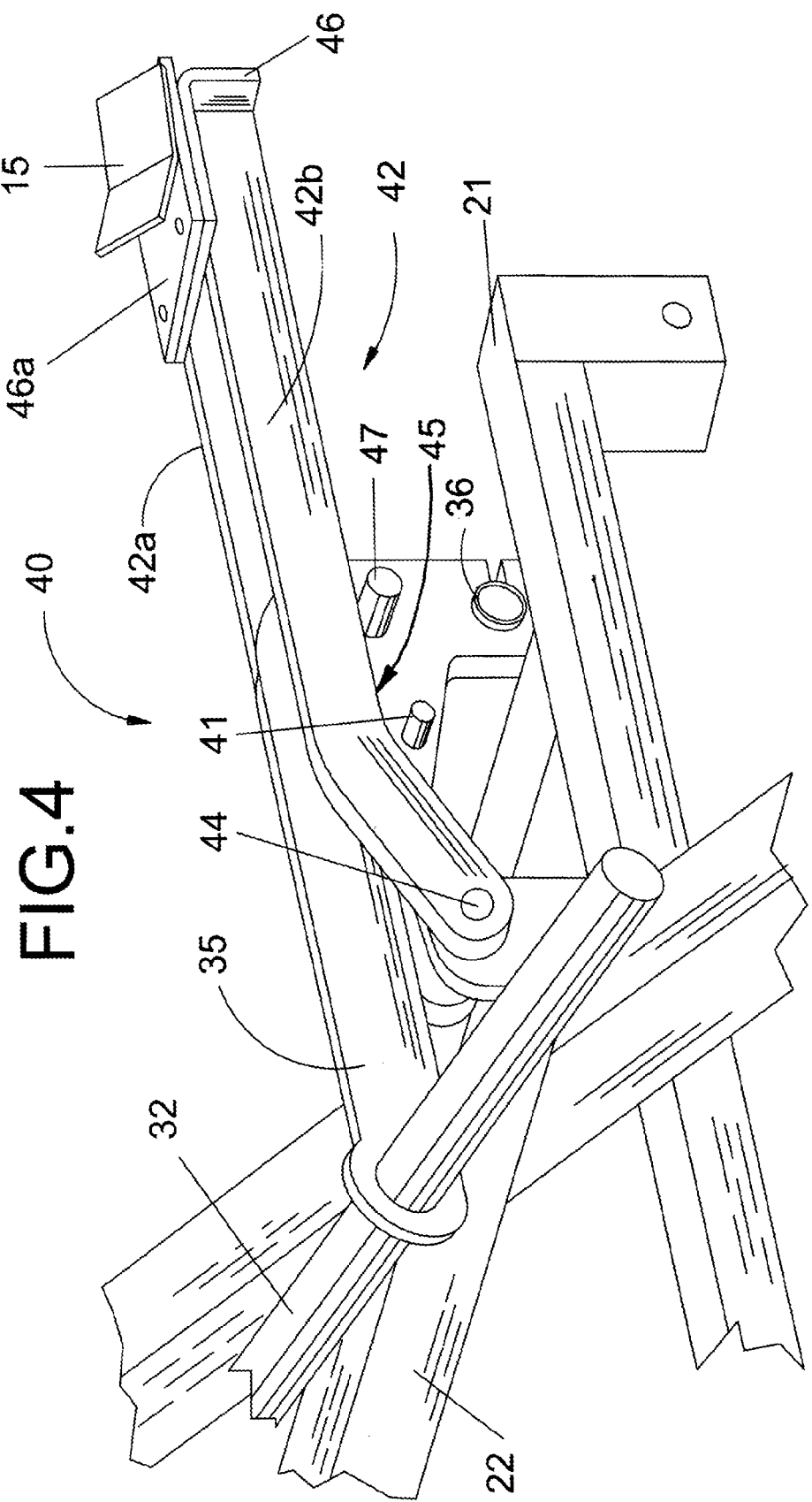
FIG. 4 is a partial isometric view of the merger lift mechanism showing the connection of the merger lift assist bar to the lift mechanism linkage.

FIG. 4 illustrates a method of constructing one embodiment of the lift assist device of the present invention. Lift member 42 is shown comprised of a pair of generally parallel elongate plate members 42a, 42b arranged with a space therebetween. Plate members 42a, 42b are preferably formed from plate material having generally parallel and opposing side surfaces separated by an edge. The plate members 42a, 42b are connected in a fixed in relation to each other by pin connection 44 at one end and bearing pad 46 at the opposing end. The edge structure 47 of each plate member 42a, 42b has a substantially similar contour so that each edge structure will simultaneously contact and remain in contact with the fulcrum structure 47, when appropriate, thus enabling the pair of plate members to function as an integrated lift member. Lift arm 35 is disposed in the space between elongate members 42a, 42b with fulcrum structure 47 extending distally away from each side surface of lift arm 35. The arrangement provides a balanced load on each side of lift arm 35 thereby avoiding the application of a bending load in the lift arm as would occur if only one lift arm elongate member interacted with a fulcrum structure on only one side of the lift arm. Lifting point 15 is also shown in contact with bearing pad 46 as would be the case with the merger apparatus in the non-working position. As lift point 15 is an extension of chassis 11 and to prevent excessive wear between a metal-to-metal interface caused by shear movement between the members as the lift apparatus moves into the non-working position, replaceable bearing surface 46a is applied to bearing pad 46 to reduce friction between members. Replaceable bearing surface is preferably formed from plastic and connected to bearing pad 46 in a manner allowing for its convenient replacement.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A linkage for moving a crop merger apparatus relative to a chassis of an agricultural windrower, said merger apparatus having a movable frame, said linkage for selectively moving said merger between a generally forward and lower working position and a generally rearward and upper non-working position, said linkage comprising:

first and second pivot mounts disposed on said movable frame, each said pivot mount having a pivot axis wherein said first and second pivot axes are spaced apart;

at least one elongate lift arm having generally opposing first and second ends and an axis of rotation at said first end, said axis of rotation fixed in relation to said chassis for arcuate movement of said lift arm about said axis of rotation, said lift arm having a pivot connection at said second end for connection with said first pivot mount;

a fulcrum structure connected to said lift arm at a point between said first and second ends;

a link connecting said movable frame and said chassis for causing pivotal motion of said movable frame about said first pivot axis, said pivotal motion being coordinated with motion of said movable frame during movement between said working and said non-working positions; and a lift assist member having a pin end, a distally opposed bearing pad end, and an edge structure disposed therebetween, a pin connector for connecting said pin end to said second pivot mount, and a bearing pad connected to said bearing pad end, length of said lift assist member and relative positions of said first pivot axis, said second pivot axis, said fulcrum structure, said edge structure, and said bearing pad are such that movement of said linkage from said working position toward said non-working position causes said pad end to contact said chassis and said edge member to contact said fulcrum structure enabling said lift assist member to support a portion of the weight and stabilize the said merger apparatus when in said non-working position.

2. The linkage of claim 1, wherein length of said lift assist member and relative positions of said first pivot axis, said second pivot axis, said fulcrum structure, said edge structure, and said bearing pad are such that movement of said linkage from said working position toward said non-working position causes said pad end to contact said chassis and said edge member to contact said fulcrum structure thereby enabling said lift assist member to move said merger apparatus vertically and to pivot said merger apparatus about said first pivot axis.

3. The linkage of claim 2, wherein said lift assist member comprises a pair of spaced apart elongate plate members connected at one end by said pin connector and at the opposing end by said bearing pad such that said plate members are substantially parallel with a longitudinal gap therebetween, each of said having an edge structure with a substantially similar contour.

4. The linkage of claim 3, wherein said elongate lift arm is an elongate plate-like member having opposing side surfaces and said fulcrum structure extends from each of said side surfaces.

5. The linkage of claim 4, wherein said elongate lift arm is disposed in said longitudinal gap and said fulcrum structure engages said edge structure of each said plate member substantially simultaneously.

6. The linkage of claim 5, wherein said edge structure is contoured to manage the interaction between said bearing pad and said chassis.

7. The linkage of claim 6, wherein said pin connector is a ball joint.

8. The linkage of claim 6, wherein said elongate lift arm further comprises a support structure for engaging said edge structure when said merger apparatus is moved toward said working position whereby said support structure limits movement of said lift assist member.

9. The linkage of claim 6, wherein said bearing pad further comprises a replaceable bearing surface.

10. An apparatus for selectively positioning a crop merger connected to a chassis of a windrower, the windrower having a direction of travel, said apparatus comprising:
a merger assembly having a forward edge, a rearward edge, first and second opposing ends generally defined by a frame, a conveyor disposed therebetween, and first and second pivot mounts disposed along said rearward edge, said conveyor having at least one generally planar working surface, and a directional axis defined by a direction of crop material movement from said first end toward said second end by said conveyor, said first pivot mount having a pivot axis, said second pivot mount being radially displaced from said pivot axis, said merger assembly being selectively movable between a generally forward and lower working position and a generally rearward and upper non-working position;
a lift mechanism connected to said merger assembly for moving said merger assembly between said working and said non-working positions, said lift mechanism further comprising:
a lift shaft connected to said chassis and having an axis of rotation;
at least one elongate lift arm connected at one end to said lift shaft for arcuate movement by said lift shaft about said axis of rotation, said lift arm having a pivot connection distal from said lift shaft for connection with said merger frame;
a fulcrum structure connected to said lift arm at a point between the ends of said lift arm;
a link connecting said merger assembly frame and said chassis for causing pivotal motion of said merger assembly about said pivot axis, said pivotal motion being coordinated with motion of said merger assembly as said lift mechanism moves said merger assembly between said working and said non-working positions; and
a lift assist member having a pin end, a distally opposed bearing pad end, and an edge structure disposed therebetween, a pin connector for connecting said pin end to said second pivot mount, and a bearing pad connected to said bearing pad end, length of said lift assist member and relative positions of said first pivot mount, said second pivot mount, said fulcrum structure, said edge structure, and said bearing pad are such that movement of said lift mechanism from said working position toward said non-working position causes said pad end to contact said chassis and said edge member to contact said fulcrum structure enabling said lift assist member to move said merger apparatus vertically, to pivot said merger apparatus about said first pivot axis, to support a portion of the merger apparatus weight, and to stabilize said merger apparatus, all when said merger apparatus is in said non-working position.

11. The apparatus of claim 10, wherein said lift assist member comprises a pair of spaced apart elongate plate members connected at one end by said pin connector and at the opposing end by said bearing pad such that said plate members are substantially parallel with a longitudinal gap therebetween, each of said having an edge structure with a substantially similar contour.

12. The apparatus of claim 11, wherein said elongate lift arm is an elongate plate-like member having opposing side surfaces and said fulcrum structure extends from each of said side surfaces.

13. The apparatus of claim 12, wherein said elongate lift arm is disposed in said longitudinal gap and said fulcrum structure engages said edge structure of each said plate member substantially simultaneously.

14. The apparatus of claim 13, wherein said edge structure is contoured to manage the interaction between said bearing pad and said chassis.

15. The apparatus of claim 14, wherein said pin connector is a ball joint.

16. The apparatus of claim 14, wherein said elongate lift arm further comprises a support structure for engaging said edge structure when said merger apparatus is moved toward said working position whereby said support structure limits movement of said lift assist member.

17. The apparatus of claim 14, wherein said bearing pad further comprises a replaceable bearing surface.

* * * * *